| United States Patent [19] | [11] Patent Number: 5,073,289 |
| --- | --- |
| Collier et al. | [45] Date of Patent: Dec. 17, 1991 |

[54] PAINT STRIPPER COMPOSITION HAVING REDUCED VOLATILITY CONTAINING DECANOLACTONE, N-METHYLPYRROLIDONE AND BUTYROLACTONE AND METHOD OF USE

[75] Inventors: Harvest L. Collier; Gary L. Bertrand; Raymond L. Venable, all of Rolla, Mo.

[73] Assignee: The Curators of the University of Missouri, Rolla, Mo.

[21] Appl. No.: 505,841

[22] Filed: Apr. 5, 1990

Related U.S. Application Data

[63] Continuation of Ser. No. 430,887, Nov. 2, 1989.

[51] Int. Cl.$^5$ .................. C09D 9/00; C11D 7/22; C11D 7/50
[52] U.S. Cl. .................. 252/162; 252/170; 252/171; 252/172; 252/364; 252/DIG. 8
[58] Field of Search .............. 252/DIG. 8, 162, 170, 252/171, 172, 364

[56] References Cited

U.S. PATENT DOCUMENTS

| 2,438,038 | 3/1948 | Craver | 252/DIG. 8 |
| 2,443,173 | 6/1948 | Baum et al. | 252/DIG. 8 |
| 2,935,479 | 5/1960 | Oberdorfer. Jr. | |
| 3,075,923 | 1/1963 | Berst et al. | |
| 3,094,491 | 6/1963 | Greminger et al. | |
| 3,147,224 | 9/1964 | Gauntt et al. | 252/DIG. 8 |
| 3,189,553 | 6/1965 | Lange | |
| 3,382,031 | 5/1968 | Cox | |
| 3,382,032 | 5/1968 | Cox | |
| 3,382,181 | 5/1968 | Oberdorfer, Jr. | |
| 3,574,123 | 4/1971 | Laugle | |
| 4,024,085 | 5/1977 | Kobayashi et al. | 252/DIG. 8 |
| 4,120,810 | 10/1978 | Palmer | 252/171 |
| 4,445,939 | 5/1984 | Hodson | 252/171 |
| 4,508,634 | 4/1985 | Elpano et al. | |
| 4,579,627 | 4/1986 | Brailsford | |
| 4,594,111 | 6/1986 | Coonan | |
| 4,645,617 | 2/1987 | Vivian | |
| 4,865,758 | 9/1989 | Caster et al. | 252/171 |
| 4,927,556 | 5/1990 | Dokorny | 252/171 |

FOREIGN PATENT DOCUMENTS

| 48808 | 8/1988 | European Pat. Off. |
| 1161596 | 12/1983 | U.S.S.R. |
| 1023213 | 3/1966 | United Kingdom |

OTHER PUBLICATIONS

Chemical Abstract Citation 108(10):77333 (R090568, Motoin et al.).

Primary Examiner—Paul Lieberman
Assistant Examiner—William S. Parks
Attorney, Agent, or Firm—Litman, McMahon & Brown

[57] ABSTRACT

An improved composition of matter and method of use for removing cured coatings of paint or varnish or other similar coatings from substrates. The composition comrpises chlorinated solvent paint strippers (especially methylene chloride ($CH_2Cl_2$)), waxes and an additive selected from the group consisting of decanolactone ($C_{10}H_{18}O_2$), N-methylpyrrolidone ($CH_3NCH_2CH_2CH_2CH_2$) and butyrolactone ($OCH_2CH_2CH_2CO$). The additive retards the evaporation of the solvent resulting in a composition that is environmentally less hazardous to a user and also resulting in improved stripping effectiveness.

6 Claims, 1 Drawing Sheet

EVAPORATION RATE - METHYLENE CHLORIDE, WAX SOLUTIONS

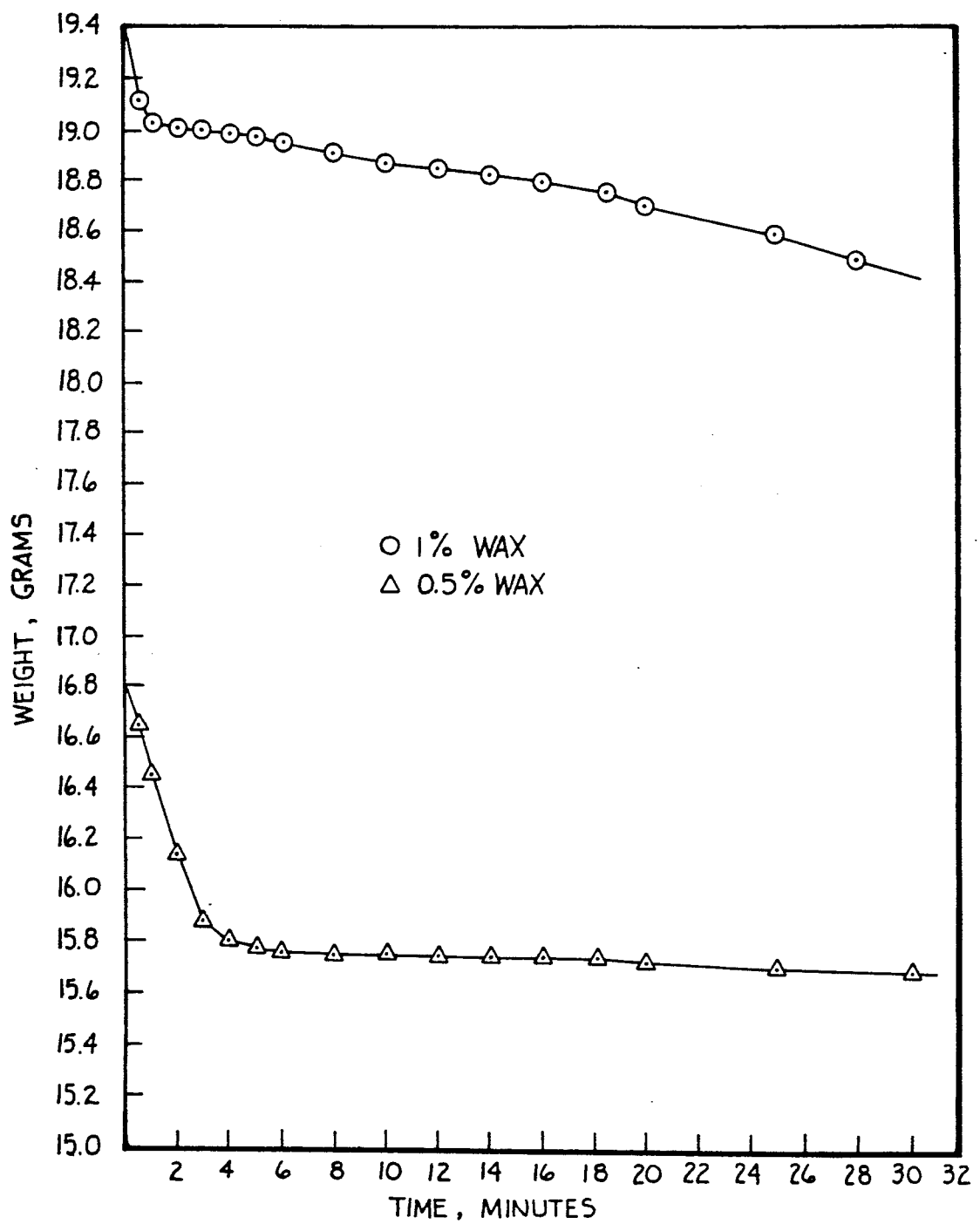
FIGURE 1. EVAPORATION RATE – METHYLENE CHLORIDE, WAX SOLUTIONS

PAINT STRIPPER COMPOSITION HAVING REDUCED VOLATILITY CONTAINING DECANOLACTONE, N-METHYLPYRROLIDONE AND BUTYROLACTONE AND METHOD OF USE

CROSS REFERENCE TO RELATED APPLICATION

The present application is a continuation of U.S. patent application Ser. No. 07/430,887, pending.

BACKGROUND OF THE INVENTION

This invention relates to an improved stripper composition. More particularly, this invention relates to a paint stripper composition including additives which reduce the volatility of solvents present in the paint stripper formulation.

Paint strippers are generally useful for removing cured coatings of paint or varnish or other similar coatings from a substrate (e.g. wood funiture, interior wood trim in a house, etc.) which is desired to be refinished. Paint stripper formulations typically include methylene chloride ($CH_2Cl_2$) as a major component which is very effective in penetrating and dissolving most cured coatings of paint or varnish or other like coatings without damaging the substrate. In addition to methylene chloride, stripper compositions may also include aromatic hydrocarbons, acetate esters, water, surfactants, polymers, and paraffins.

A particular stripper formulation will vary depending upon the chemical composition of the coating to be stripped from the substrate or surface. The chemical composition of coatings may include acrylic resins (protective and decorative lacquers for paper, fabrics, leather, plastics, wood and metal), alkyds (oil-modified phthalic resins which react with ambient oxygen), cellulosics (cellulose nitrate and cellulose acetate typically combined with alkyds and amino resins to produce a tough, hard, durable lacquer for automotive, aircraft and other industrial finishes), oils (linseed oil base coating for exterior wood and metal surfaces), and urethanes and phenolics (typically providing durable clear finishes on exterior surfaces and floors), to mention only a few.

Paint stripper formulations will also vary depending upon desired characteristics such as chemical stability, shelf life, and desired surface activation properties. In addition, paraffin waxes are typically added to the composition to reduce the evaporation rate of chlorinated solvents. The purpose of reducing the evaporation rate of chlorinated solvents in the stripper formulations is to improve the effectiveness of the formulation as well as to reduce the presence of chlorinated hydrocarbons in working environments. However, even with the addition of waxes to a stripper formulation, the evaporation rate of chlorinated solvents is generally still unacceptably high.

Therefore, it is desirable to provide additives which reduce the evaporation rate of chlorinated solvents and thereby reduce human exposure to solvents and also improve the effectiveness of the stripper.

SUMMARY OF THE INVENTION

An improved stripper composition is provided for stripping cured coatings of paint, varnish or other similar coatings, which improved composition comprises a major portion of methylene chloride, a minor portion of natural or synthetic wax, and a minor portion of additives, which additives are selected from the group consisting of decanolactone ($C_{10}H_{18}O_2$), N-methylpyrrolidone ($CH_3NCH_2CH_2CH_2CH_2$) and butyrolactone ($OCH_2CH_2CH_2CO$). The improved stripper composition in application may be applied to a substrate containing a cured paint, varnish, or other similar coating and if allowed to remain undisturbed on such coating for a specified amount of time (which will vary according to the composition of the coating and ambient conditions, such as temperature and humidity), will dissolve the coating, or some portion thereof, and will usually result in a reduced ambient concentration of methylene chloride.

OBJECTS OF THE INVENTION

The principal objects of the present invention are: to provide improved stripper composition for facilitating the removal of cured coatings of paint, varnish or other similar coatings; to provide such an improved stripper composition which minimizes the evaporation rate of methylene chloride ($CH_2Cl_2$) or other chlorinated solvents from the stripper composition once it is applied to the substrate; to provide such an improved stripper composition with additives which do not appreciably adversely affect the ability of methylene chloride or other chlorinated solvents in penetrating and dissolving cured coatings; to provide such an improved stripper composition which reduces the potential for human overexposure to methylene chloride or other chlorinated solvents; and to provide such an improved stripper composition which is relatively easy to manufacture, relatively inexpensive to produce, and which is particularly well adapted for the intended usage thereof.

Other objects and advantages of this invention will become apparent from the following description wherein is set forth, by way of illustration and example, certain embodiments of this invention.

BRIEF DESCRIPTION OF THE DRAWINGS

FIG. 1 shows how the evaporation rate of methylene chloride varies with time for different concentrations of wax.

DETAILED DESCRIPTION OF THE INVENTION

As required, detailed embodiments of the present invention are disclosed herein; however, it is to be understood that the disclosed embodiments are merely exemplary of the invention, which may be embodied in various forms. Therefore, specific details disclosed herein are not to be interpreted as limiting, but merely as a basis for the claims and as a representative basis for teaching one skilled in the art to variously employ the present invention in virtually any appropriately detailed composition.

In accordance with the present invention, it has been determined that the rate of evaporation of chlorinated solvents, particularly methylene chloride, in stripper formulations including wax, can be improved with regard to the retardation of evaporation as well as with respect to other properties such as stripping effectiveness and stripping rate by including additives selected from the group consisting of decanolactone ($C_{10}H_{18}O_2$), N-methyl-pyrrolidone ($CH_3NCH_2CH_2CH_2CH_2$) and/or butyrolactone ($OCH_2CH_2CH_2CO$) to the formulation. It has also been found that decanolactone, N-methylpyrrolidone and butyrolactone retard the evaporation rate of methylene chloride, a solvent present in major portions in a wide variety of commercially available stripper formulations, without any appreciable detrimental effect in the performance of the commercial stripper.

In its broadest sense, this invention is in the discovery that the addition of small amounts of decanolactone, N-methylpyrrolidone and/or butyrolactone (compounds which contain carbonyl functionalities capable of strong intermolecular interactions with methylene chloride) can effectively reduce the rate of evaporation of methylene chloride or any other chlorinated solvents by a significant factor.

Experimentation has established that best results are obtained in formulations of about 1.0% and 2.0% by weight wax (based on total weight of formulation), about 1.0% gelling agent, and preferably about 1.0% by weight additive wherein the additive is selected from a group comprising five membered-ring heterocyclic compounds, and in particular decanolactone, N-methylpyrrolidone and butyrolactone.

The examples which follow are for the purpose of illustrating certain embodiments of the invention and are not intended to be limiting upon the scope of the invention or claims.

EXAMPLES

A series of experiments were made to determine the effectiveness of various additives to stripper formulations in reducing the evaporation rate of methylene chloride. Both thermodynamic (equilibrium) and kinetic (dynamic) effects were considered. While lowering the equilibrium vapor pressure (i.e., the thermodynamic activity) will lower the evaporation rate, any lowering of the equilibrium vapor pressure also typically lowers the ability of methylene chloride to penetrate a coating, which penetrating ability is in part a function of kinetic effects. Thus, experimentation was also directed to kinetic effects associated with methylene chloride in paint stripping.

Further, experimentation was directed to the effects of evaporation barriers since evaporation rates are customarily controlled by creation of a physical barrier between a liquid and the vapor space above. Incorporation of wax into the stripper formulation is the most common way to form such a barrier in commercial paint stripping formulations. However, previous studies on solid films, including waxes, have suggested that the brittleness of such films could lead to erratic effectiveness. By contrast, a liquid film could be "self healing." Thus, experimentation was also directed to the effect of a combined liquid-solid barrier on the evaporation rate of methylene chloride. In particular, experimentation included a study of the effect of alcohols (wax desolubilizers) and hydrocarbons (wax solubilizers) on evaporation barrier properties.

Sample Preparation: The desired quantity of wax was weighed into a tared bottle and the approximate amount of methylene chloride added to obtain the targeted wax concentration. This mixture was warmed in hot water, often bringing methylene chloride to a boil, in a fume hood until the wax dissolved. The bottle was dried, its contents re-weighed and sufficient methylene chloride added to achieve the desired wax concentration. If appropriate, a thickening agent was weighed into a 20 ml screw cap bottle, and the methylene chloride-wax solution was added until the solution volume totalled about 15 ml. The solution was shaken and re-weighed, prior to adding other components or additives. All samples were allowed to stand overnight prior to measuring evaporation rates. By the next day the samples were usually gelled and in many cases some of the wax had come out of solution and formed a separate layer.

Materials: Aldrich HPLC grade methylene chloride was used in all formulations. Several different waxes were used: a pure paraffin canning wax, a slightly softer and lower-melting microcrystalline wax (so-called "slack wax") and a simulated slack wax prepared by mixing the paraffinic canning wax and 5 to 20 percent by weight hexadecane. Commercially available samples of hydroxypropyl cellulose ("S23") and ethylcellulose ("S105") were used as thickening or gelling agents, with the hydroxypropyl cellulose ("S23") being favored because it gelled more consistently in the presence of methylene chloride and other components or additives. Surfactants used were commercially available.

Equipment: Samples were evaporated from glass petri dishes which were approximately 9 cm in diameter and approximately 1 cm deep, supplied with a slightly larger dish acting as a loosely fitted cover. Samples were weighed on a Sartorius Top-Loading Balance, Model 1205 MP, readable to 0.001 gram, interfaced to a strip chart recorder (full scale =2 grams). Weighings were in a fume hood. Reproducibility was improved by positioning a baffle about the petri dish during weighing.

Evaporation Protocols: Initially, samples were shaken, then poured directly into a tared dish on the balance. A timer was started, the baffle set in place and initial weight reading taken as quickly as possible. Samples which did not contain wax experienced a rapid weight loss which was almost linear with time. The weight loss persisted until the sample had reached dryness.

For samples containing wax, an initial period of rapid weight loss was followed by an abrupt reduction in rate of evaporation ("shut down"), after which the reduced rate remained generally constant until most of the methylene chloride had evaporated. Samples containing wax displayed poor reproducibility in that, between samples there was great variation in time required to "shut down", in the total weight lost prior to the "shut down" and in the rate of evaporation after "shut down". Variations between replicate samples of a factor of two, and some times substantially more, were not uncommon. Variations were also observed in the surface films formed by replicate solutions.

An effort was made to find the cause of variation in evaporation between essentially duplicate samples. Some insights were gained into the barrier forming processes by modification of the evaporation tests. These insights were incorporated into test "Protocol 1" and confirmed the importance of the wax film in controlling the shut down process.

Protocol 1. Samples were shaken and poured into a tared petri dish set on the Sartorius balance, the baffle set in place and weight loss recorded until ten minutes after shut down had elapsed. The petri dish was then covered for ten minutes, after which the cover was removed and the weight loss again recorded. The later result (corrected for elapsed time) was taken as the rate of evaporation.

Protocol 2. At higher concentrations of wax or as more effective additives were studied, Protocol 1 became prohibitively slow. To increase productivity a number of chimneys were constructed so that up to 14 samples could be monitored simultaneously. Instead of continuous recording of weight loss, samples were weighed at 15 minute intervals for two hours or more if necessary to achieve a total weight loss of at least 0.1 gram.

Replicate samples showed no consistent variation with position in the hood. Replication was poorer than in Protocol 1 but still better than in the early stages of the project for samples with lower evaporative losses.

Strippability Testing: Stripping evaluations on prepared test panels were performed according to spot tests described in the Rodale's New Shelter July/August, 1983 article for alkyd and urethane enamels. A 5 ml quantity of stripper was placed on a test panel, covered with a watch glass, and allowed to stand 20 minutes before making a single pass scrape to remove loosened paint and stripper. Stripped spots were evaluated by visual observation and reported as the color of the layer remaining.

In cases where the paint was stripped to the primer, an estimate of the primer area was reported. In addition, the degree of primer showing was determined by using a wire grid (e.g., 80 units per square inch) and the relative percentage of primer showing was based on the relative percentage of grid openings showing primer. Direct comparison of results from the visual and grid methods showed less than 5 percent variation, and the resulting data was considered to be the same.

Test Panels: The panels were prepared from 6 inch by 12 inch pine boards coated with four layers of a quality alkyd enamel in one series or four layers of a quality urethane enamel in a second series. Each layer of paint had a different color, with the base primer coat being white. Different colored layers made the number of layers removed by the stripping formulation readily apparent.

Several approaches were tried in conditioning the test panels. In one set of panels, each layer of paint was air dried prior to applying a subsequent layer. The painted panel was then placed in a forced-air oven at 110° C. for 24 hours. A second set of panels was prepared by successively air drying (24 hours) and baking each applied layer overnight. A third set of panels was prepared by air drying each paint layer and allowing the painted panels to "age" at room temperature for ten weeks before being used.

The Experimental Matrix

The research effort was based on a matrix of data detailing information on the evaporation rate of methylene chloride in increasingly more complex mixtures of those components, e.g., methylene chloride, waxes and/or oils, thickening or gelling agent, lower alcohols (methanol), and toluene, each of which are typically found in commercial paint strippers. The matrix was expanded to include "additives" which were thought to have the potential of reducing the evaporation rate of methylene chloride.

Successive levels of the experimental matrix, in order of increasing complexity, were as follows:
Methylene Chloride.
Methylene Chloride, Wax.
Methylene Chloride, Wax, Gelling Agent.
Methylene Chloride, Wax, Gelling Agent, Methanol.
Methylene chloride, Wax, Gelling Agent, Methanol, Toluene.

In addition to the main branch of the matrix, studies were also conducted without the inclusion of wax, including:
Methylene Chloride, Gelling Agent.
Methylene Chloride, Methanol.
Methylene Chloride, Gelling Agent, Methanol.

At each matrix level, "additives," were added to the formulation to determine their impact on the evaporation rate of methylene chloride. The additives studied fell into four general groups, five membered-ring heterocyclic compounds of the present invention, non-ionic surface active chemicals (surfactants), highly oxygenated simple organic compounds and a miscellaneous group of chemicals, as noted hereinafter, which were tried mostly on an exploratory basis.

Methylene Chloride Studies

The weight loss studies were run as part of the overall data gathering effort on the first few levels of the experimental matrix. Measured evaporation rates for methylene chloride alone were generally, for any given sample, fairly uniform until dryness. A number of studies were done in which the effect of a baffle, cover, position within the fume hood and other operational factors were evaluated. Overall the reproducibility for methylene chloride alone was fairly good. Actual results from a variety of test situations generally fall within 26 to 31 mg/min/sq. in. The overall average (Table 1) was 29.1 mg/min/sq. in.

TABLE 1

| SOLN. NO. | METHYLENE CHLORIDE, WAX SOLUTIONS | | | |
|---|---|---|---|---|
| | COMPOSITION | WT % | EVAP. RATE MG/MIN/SQ. IN. | NO. OF TESTS |
| 1 | METHYLENE CHLORIDE | | 29.1 | 14 |
| 2 | METHYLENE CHLORIDE + HEXADECANE | 0.4–12 | 26.3 | 3 |
| | METHYLENE CHLORIDE | | | |
| 3A | + WAX | 0.5 | 1.8 | 20 |
| 3B | + WAX | 1.0 | 2.2 | 11 |
| 3C | + WAX | 1.5 | 0.4 | 1 |
| | AVERAGE | | 1.9 | 32 |
| | METHYLENE CHLORIDE, SLACK WAX | | | |
| 4A | + WAX | 0.5 | | |
| | + HEXADECANE | 12.0 | 0.5 | 1 |
| 4B | + WAX | 1.0 | | |
| | + HEXADECANE | 12.0 | 1.6 | 13 |
| 4C | + WAX | 1.0 | | |
| | + HEXADECANE | 8.0 | 1.7 | 2 |
| 4D | + WAX | 1.5 | | |

TABLE 1-continued

| METHYLENE CHLORIDE, WAX SOLUTIONS | | | |
|---|---|---|---|
| SOLN. NO. | COMPOSITION | WT % | EVAP. RATE MG/MIN/SQ. IN. | NO. OF TESTS |
| | + HEXADECANE | 8.0 | 1.2 | 1 |
| | AVERAGE | | 1.5 | 17 |

Methylene Chloride—Wax

Samples containing wax exhibited a more complex evaporation rate curve. During an initial period prior to the formation of the wax barrier ("shut down period"), the evaporation roughly approximated that of methylene chloride. After the wax barrier had formed, a substantially lower evaporation rate ("steady state rate") was observed. The "steady state rate" evaporation rate usually persisted for a substantial period of time.

As previously stated, reproducibility of evaporation rate measurements in systems containing wax were poor. Reproducibility was a problem not only for the steady state rate measurements, but also for the length of time prior to shut down. In an attempt to overcome this problem a considerable number of weight loss protocols were tried. Replicate samples from the same "master" solution could at times exhibit evaporation rates which differed by a factor of 2 to 10.

The overall experimental strategy, however, centered on measuring the effect of individual components or additives on the evaporation rate. Thus, the poor reproducibility of evaporation rate measurements in methylene chloride and wax mixtures was not found to be an obstacle to experimentation because the experimental focus was on broader concepts (i.e., rate differences between mixtures with versus mixtures without additives).

A wax level of 0.5 percent by weight was about as effective (Table 1) as 1.0 weight percent in reducing the evaporation rate. However, the shut down period was about one-third less with 1.0 percent wax solution as with a 0.5 percent solution (FIG. 1).

An attempt was made to determine whether wax "type" impacts on barrier quality. Two types of wax (a highly refined paraffinic wax and "slack wax") are used in commercial formulations. These materials are similar in that they are composed of long chained paraffinic hydrocarbons. However, slack wax consists of a broader molecular weight range and some of the hydrocarbons present are normally a liquid at room temperature.

Slack wax was simulated in these studies by using a mixture of paraffinic wax and hexadecane. Hexadecane was chosen to represent the liquid fraction in slack wax because it is essentially non-volatile. Evidently hexadecane did not contribute much to the solubilization of wax in these predominantly methylene chloride solutions as the wax-hexadecane solutions were usually cloudy. The overall evaporation rate averages for paraffinic wax and slack wax were 1.9 and 1.5 mg/min/sq. in., respectively (Table 1). The lower numbers for cloudy hexadecane solutions suggest that as the concentration of wax in methylene chloride approaches its saturation point in a formulation, the barrier will more readily form and the effectiveness of the barrier will be improved. The evaporation rate for methylene chloride-hexadecane solutions (Table 1) were within the range for methylene chloride alone.

A number of additional experiments were run (Table 2) which focused solely on the impact of "components" on the evaporation rate.

TABLE 2

| EFFECT OF WAX IN SIMPLE MIXTURES | | | | |
|---|---|---|---|---|
| SOLN. NO. | COMPOSITION | WT % | EVAP. RATE MG/MIN/SQ. IN. | NO. OF TESTS |
| 1 | METHYLENE CHLORIDE | | 29.1 | 14 |
| 2 | METHYLENE CHLORIDE + WAX | 0.5–1.5 | 1.9 | 32 |
| 3 | METHYLENE CHLORIDE + METHANOL | 0.7–4.0 | 25.3 | 3 |
| 4 | METHYLENE CHLORIDE | | | |
| | + METHANOL | 1.0–5.2 | | |
| | + WAX | 0.5–1.0 | 1.4 | 12 |
| 5 | METHYLENE CHLORIDE | | | |
| | + GELLING AGENT (S23) | 1.0 | 22.0 | 2 |
| 6 | METHYLENE CHLORIDE | | | |
| | + GELLING AGENT (S23) | 1.0 | | |
| | + WAX | 0.5–1.0 | 1.3 | 4 |
| 7 | METHYLENE CHLORIDE | | | |
| | + GELLING AGENT (S23) | 1.0 | | |
| | + METHANOL | 4.0 | 21.1 | 4 |
| 8 | METHYLENE CHLORIDE | | | |
| | + GELLING AGENT (S23) | 1.0 | | |
| | + METHANOL | 2.0–4.0 | | |
| | + WAX | 0.4–1.0 | 0.46 | 22 |

Evaporation rate data are shown for (1) methylene chloride alone; (2) in binary mixtures with methanol or gelling agent; and (3) a ternary mixture of methylene chloride, methanol and gelling agent. Data are also presented for each solution where wax has been added as an additional component. The data suggest that mixing methanol and gelling agent does impact, but to a modest extent, the evaporation rate of methylene chloride solutions that do not contain wax. The data of Table 2 establish the base evaporation rates of interest.

The contribution of methanol and gelling agent to reduced evaporation rates seems to be observable even in the more complex solutions containing wax. In methylene chloride-wax solutions, methanol or the gelling agent seem to contribute roughly equally to the reduction of the evaporation rate and their effectiveness seems to be additive as the combination of gelling agent, wax and methanol drops the evaporation rate another 0.9 mg/min/sq. in.

Surfactants Studies

The first class of additives studied were non-ionic surface active materials ("surfactants"). Included in this study were a fluorinated compound, and various non-ionic ethers and esters (Table 3).

TABLE 3

| SURFACTANTS | | |
|---|---|---|
| Tradename | Supplier | Major Ingredient |
| Zonyl FSN | E. I. DuPont & Co | Nonionic fluorochemical surfactant |
| Crodesta F-10 | Croda Inc. | Sucrose distearate |
| Crodesta F-50 | Croda Inc. | 71/29 mixture of sucrose di- and mono-stearate |
| Crodesta F-110 | Croda Inc. | 48/52 mixture of sucrose di- and mono-stearate |
| Alkamuls SMO | Alkaril Chemicals | Sorbitan monooleate |
| Alkamide L7DE | Alkaril Chemicals | Lauric-myristic monoethanolamide |
| Alkamide 1002 | Alkaril Chemicals | Coconut alkanolamide |

TABLE 3-continued

| SURFACTANTS | | |
|---|---|---|
| Tradename | Supplier | Major Ingredient |
| Arlacel 20 | ICI Americas Inc. | Sorbitan monolaurate |
| Arlacel 40 | ICI Americas Inc. | Sorbitan monopalmitate |
| Arlacel 60 | ICI Americas Inc. | Sorbitan monostearate |
| Arlacel 80 | ICI Americas Inc. | Sorbitan monooleate |
| Brij 30 | ICI Americas Inc. | Polyoxyethylene (4) lauryl ether |
| Brij 35 | ICI Americas Inc. | Polyoxyethylene (23) lauryl ether |

Some of these materials, e.g., the sucrose esters, were recognized by Cox in a British Patent 1,023,213 as being particularly effective in reducing the evaporation rate for volatile organic compounds. Most of the surfactants seemed to have had some effect (Table 4) in lowering the evaporation rate as the observed evaporation rates generally fell in the 15 to 24 mg/min./sq. in. range.

TABLE 4

| METHYLENE CHLORIDE, SURFACTANT STUDIES | | | | |
|---|---|---|---|---|
| SOLN. NO. | COMPOSITION | WT % | EVAP. RATE MG/MIN/SQ. IN. | NO. OF TESTS |
| 1 | METHYLENE CHLORIDE | | 29.1 | 14 |
| | METHYLENE CHLORIDE + SURFACTANT ADDITIVE | | | |
| 2A | ZONYL FSN 100 | 3-12 | 19.9 | 4 |
| 2B | CRODESTA F10 | 1.0 | 20.2 | 1 |
| 2C | CRODESTA F50 | 1.0 | 0.4 | 4 |
| 2D | CRODESTA F110 | 1.0 | 1.0 | 4 |
| 2E | ALKARIL A1002 | 1.0 | 23.8 | 1 |
| 2F | ALKARIL AL7DE | 1.0 | 24.5 | 1 |
| 2G | ALKARIL SMO | 1.0 | 23.7 | 1 |
| 2H | ARLACEL 20 | 1.0 | 15.4 | 1 |
| 2I | ARLACEL 40 | 1.0 | 23.3 | 1 |
| 2J | ARLACEL 60 | 1.0 | 0.1 | 1 |
| 2K | ARLACEL 80 | 1.0 | 22.8 | 1 |

Of the materials studied (Table 4), only the mixed sucrose esters Crodesta F-50 and F-110 and sorbitan monostearate were effective in substantially reducing evaporation rates. Esters containing monostearate were effective while neither the monopalmitate nor monooleate seemed to impact the evaporation rate significantly. The monostearate appeared to form platelets on the surface. These results differ somewhat from the observations made by Cox for benzene-surfactant solutions. The evaporation rate for methylene chloride-Crodesta F50 was one of the lowest recorded in the early stages of this study.

TABLE 5

| METHYLENE CHLORIDE, WAX, SURFACTANT STUDIES | | | | |
|---|---|---|---|---|
| SOLN. NO. | COMPOSITION | WT % | EVAP. RATE MG/MIN/SQ. IN. | NO. OF TESTS |
| 1 | METHYLENE CHLORIDE + WAX | 0.5 | 1.9 | 32 |
| | METHYLENE CHLORIDE + WAX + SURFACTANT ADDITIVE | 0.5 | | |
| 2A | ZONYL FSN 100 | 1-4 | 15.2 | 3 |
| 2B | CRODESTA F50 | 1.0 | 4.3 | 2 |
| 2C | CRODESTA F110 | 1.0 | 3.4 | 2 |
| 2D | ARLACEL 40 | 1.0 | 1.1 | 1 |
| 2E | ARLACEL 60 | 1.0 | 0.7 | 1 |

An additional set of experiments were run with methylene chloride and some of the above surfactants. However, these tests (Table 5) also included 0.5 percent wax.

The average evaporation rate for wax-methylene chloride was, as noted earlier, 1.9 mg/min/sq. in. Neither of the two Crodesta sucrose derivatives seemed to be beneficial in that the evaporation rate for these materials in wax-methylene chloride solution was higher than the baseline rate. Zonyl FSN-100 seemed to be very disruptive to the barrier. It is theorized that the fluorocarbon may have caused some "wetting" problems which resulted in poor adhesion between wax platelets. Of the two sorbitan derivatives tested, Arlacel 40 was much more effective in this composition than when compared to its inclusion as the sole additive in methylene chloride, i.e., 1.1 versus 23.3 mg/min/sq. in. On the other hand, Arlacel 60, which was effective in methylene chloride alone with an evaporation rate of 0.1 mg/min/sq. in., was less effective in the presence of wax, 0.7 mg/min/sq. in. The evaporation rate for Arlacel 60-methylene chloride-wax solution was still lower than that shown by the methylene chloride-wax baseline measurements.

The data suggests that the influence of large surfactant molecules on the wax barrier can be significant both in a positive or negative direction in relatively simple solutions. The study seems to also suggest that the wax barrier formation takes place within a small region near the surface and is influenced by the concentration of wax and changing solubility limits for wax in this region. The ability of these large molecules to participate in barrier formation in more complex solutions containing gelling agents is questionable. The research efforts therefore shifted focus to smaller more mobile molecules.

Additive Selection

In selecting additives which might desolubilize wax, and thus, decrease the evaporation rate, attention was next given to compounds which contained a high concentration of polar groups or groups that might be capable of forming hydrogen bonds with methylene chloride. The primary candidates were alcohols, ethers, esters and amines. Other than the shorter alcohols and amines, these compounds are miscible with liquid saturated hydrocarbons, and are not expected to be very effective at desolubilizing wax.

The five membered ring heterocyclic derivatives of the present invention were the "first generation" of additives studied. Prior studies have shown that simple heterocyclic compounds containing a carbonyl functionality were capable of very strong inter-molecular interactions, perhaps stronger than conventional hydrogen bonding as evidenced by boiling points in excess of 200° C. Included in this group were butyrolactone (1,4-butanolide), 2-pyrrolidone, N-methyl pyrrolidone and related compounds. Propylene carbonate was also included in the subsequent test program.

Further, the limited miscibility of methylene chloride and glycerin suggested that glycerin offered potentials as an additive. Glycerin, with a density intermediate between that of wax and methylene chloride, it is theorized, comes out of solution near the surface and provides a liquid layer in addition to the wax barrier. These considerations led to the inclusion of glycerin and the related ethylene glycol as "second generation" additives in the research effort.

The effectiveness of glycerin also led to studies with various polyethylene glycols of different molecular weights as well as a polyethylene glycol-methyl ether.

Finally some experiments were undertaken with amine derivatives.

Methylene Chloride, Wax, Additive Studies

The simpler 5-member ring heterocycles had only a limited influence on the evaporation rate for methylene chloride (Table 6). Likewise, more complex solutions containing methanol and/or a gelling agent had limited influence on evaporation rate (Table 7). Of the materials studied only propylene carbonate seemed to reduce the evaporation rate in methylene chloride solutions (without wax) that contained gelling agent and methanol.

TABLE 6

| | METHYLENE CHLORIDE, ADDITIVE STUDIES [NO WAX] | | | |
|---|---|---|---|---|
| SOLN. NO. | COMPOSITION | WT % | EVAP. RATE MG/MIN/SQ. IN. | NO. OF TESTS |
| 1 | METHYLENE CHLORIDE | | 29.1 | 14 |
| 2 | METHYLENE CHLORIDE + (gamma)-DECANOLACTONE | 1.0 | 25.1 | 2 |
| 3 | METHYLENE CHLORIDE + (delta)-DECANOLACTONE | 1.0 | 29.8 | 2 |

TABLE 7

| | METHYLENE CHLORIDE, GELLING AGENT, METHANOL, ADDITIVE STUDIES [NO WAX] | | | |
|---|---|---|---|---|
| SOLN. NO. | COMPOSITION | WT % | EVAP. RATE MG/MIN/SQ. IN. | NO. OF TESTS |
| 1 | METHYLENE CHLORIDE | | | |
| | + GELLING AGENT S23 | 1.0 | | |
| | + METHANOL | 4.0 | 21.1 | 4 |
| | METHYLENE CHLORIDE | | | |
| | + GELLING AGENT (S23) | 1.0 | | |
| | + METHANOL | 4.0 | | |
| | + HETEROCYCLIC ADDITIVE | | | |
| 2A | N-METHYLPYRROLIDONE | 1.0 | 20.9 | 2 |
| 2B | BUTYROLACTONE | 1.0 | 21.8 | 2 |
| 2C | PROPYLENE CARBONATE | 1.0 | 16.5 | 2 |
| 3 | METHYLENE CHLORIDE | | | |
| | + GELLING AGENT | 1.0 | | |

TABLE 7-continued

| METHYLENE CHLORIDE, GELLING AGENT, METHANOL, ADDITIVE STUDIES [NO WAX] | | | |
|---|---|---|---|
| SOLN. NO. | COMPOSITION | WT % | EVAP. RATE MG/MIN/SQ. IN. | NO. OF TESTS |
| | (S23) + METHANOL + GLYCERIN | 4.0 1.0 | 18.6 | 2 |

However, in accordance with the present invention a wide range of 5-member heterocyclic ring derivatives appear to enhance the effectiveness of the wax barrier in relatively simple methylene chloride-wax solutions (Table 8).

TABLE 8

| METHYLENE CHLORIDE, WAX, ADDITIVE STUDIES | | | | |
|---|---|---|---|---|
| SOLN. NO. | COMPOSITION | WT % | EVAP. RATE MG/MIN/SQ. IN. | NO. OF TESTS |
| 1 | METHYLENE CHLORIDE + WAX | 0.5-1.5 | 1.9 | 32 |
| | METHYLENE CHLORIDE + WAX + HETEROCYCLIC ADDITIVE | 0.5-1.5 | | |
| 2A | N-METHYLPYRROLIDONE | 2-5 | 1.0 | 6 |
| 2B | BUTYROLACTONE | 2-5 | 1.0 | 6 |
| 2C | PROPYLENE CARBONATE | 2-6 | 1.0 | 6 |
| 2D | 2-PYRROLIDONE | 2-5 | 1.1 | 4 |
| 2E | (gamma)-DECANOLACTONE | 2.0 | 0.6 | 1 |
| 2F | (delta)-DECANOLACTONE | 2.0 | 1.6 | 2 |
| 2G | TETRAMETHYLENE SULFONE | 2.0 | 1.6 | 2 |
| 2H | SUCCINIMIDE | 2.0 | 1.6 | 2 |
| 2I | GLYCOL SULFITE | 2.0 | 2.0 | 2 |
| | AVERAGE | | 1.2 | 31 |
| 3 | METHYLENE CHLORIDE + WAX + METHANOL | 0.5-1.5 1.0-5.0 | 1.4 | 12 |

In accordance with the instant invention effective additives were (gamma)-decanolactone, N-methylpyrrolidone, and butyrolactone and propylene carbonate were about equally as effective. All of these additives compared favorably against methanol in their ability to reduce the overall evaporation rate (Table 8). The average evaporation rate for this class of materials was 1.2 mg/min/sq. in. as compared to the baseline without additives of 1.9 mg/min/sq. in. Tetramethylene sulfone, succinimide and glycol sulfite were considered to be marginal in their effectiveness.

Some limited studies were done to determine whether paraffinic versus slack wax had an impact on the evaluation of additives. None of the 5-membered ring compounds fared as well in solutions containing 8 to 12 percent of hexadecane (Table 9).

TABLE 9

| METHYLENE CHLORIDE, SLACK WAX, ADDITIVE STUDIES | | | | |
|---|---|---|---|---|
| SOLN. NO. | COMPOSITION | WT % | EVAP. RATE MG/MIN/SQ. IN. | NO. OF TESTS |
| 1 | METHYLENE CHLORIDE + WAX + HEXADECANE | 0.5-1.5 8-12 | 1.5 | 17 |
| | METHYLENE CHLORIDE + WAX + HEXADECANE + HETEROCYCLIC ADDITIVE | 0.5-1.5 8-12 | | |
| 2A | N-METHYLPYRROLIDONE | 2.0-4.0 | 1.6 | 4 |
| 2B | BUTYROLACTONE | 2.0-4.0 | 1.4 | 4 |
| 2C | PROPYLENE CARBONATE | 2.0-4.0 | 1.8 | 4 |
| 2D | 2-PYRROLIDONE | 2.0-4.0 | 2.1 | 4 |
| | AVERAGE | | 1.7 | 16 |

It is theorized that the additive's effect on wax solubility strongly influences the evaporation rate, as illustrated by a comparison of Tables 8 and 9. The evaporation rate without hexadecane (1.2 average) was less than with hexadecane (1.7 average). The hexadecane seem to "undo", to some extent, the polar influence of the heterocyclic derivatives.

Experimental Matrix Studies

The next level of the experimental matrix to be studied consisted of methylene chloride solutions containing wax and a gelling agent, hydroxypropyl cellulose ("S23"). In these studies the level of S23 was kept constant at 1% while the wax concentration ranged from 0.5 to 1.5%. The baseline evaporation rate for the three component system was 1.26 mg/min/sq. in. (Table 10).

TABLE 10

METHYLENE CHLORIDE, WAX, GELLING AGENTS, ADDITIVES

| SOLN. NO. | COMPOSITION | WT % | EVAP. RATE MG/MIN/SQ. IN. | NO. OF TESTS |
|---|---|---|---|---|
| 1 | METHYLENE CHLORIDE | | | |
| | + WAX | 0.5–1.0 | | |
| | + GELLING AGENT (S23) | 1.0 | 1.26 | 4 |
| | METHYLENE CHLORIDE | | | |
| | + WAX | 1.0–2.0 | | |
| | + GELLING AGENT (S23) | 1.0 | | |
| | + HETEROCYCLIC ADDITIVE | | | |
| 2A | N-METHYLPYRROLIDONE | 1.0 | 0.38 | 2 |
| 2B | BUTYROLACTONE | 1.0 | 0.30 | 2 |
| 2C | PROPYLENE CARBONATE | 1.0 | 0.45 | 2 |
| 2D | (gamma)-DECANOLACTONE | 1.0 | 0.48 | 2 |
| 2E | (delta)-DECANOLACTONE | 1.0 | 0.75 | 2 |
| | AVERAGE | | 0.47 | 10 |
| | METHYLENE CHLORIDE | | | |
| | + WAX | 1.0–2.0 | | |
| | + GELLING AGENT (S23) | 1.0 | | |
| | + POLYHYDROXY ADDITIVE | | | |
| 3A | GLYCERIN | 1.0 | 0.11 | 11 |
| 3B | ETHYLENE GLYCOL | 1.0 | 0.03 | 3 |
| | AVERAGE | | 0.09 | 14 |

All of the 5-member heterocyclic derivatives studied resulted in a substantial decrease in evaporation rate when incorporated into the formulation at a level of 1.0 weight percent (Table 10). In this phase of the study N-methylpyrrolidone and butyrolactone gave the best results.

Further, solutions containing either glycerin or ethylene glycol exhibited an order of magnitude reduction in evaporation rate over the rates exhibited by solutions with 5-member heterocyclic derivatives.

The experimental program in the next matrix level included methanol in the formulation. The only component that was held constant in concentration was the gelling agent S23 at 1 weight percent. Wax was varied from 0.5 to as high as 2.0 weight percent in one experiment, while methanol ranged from 2.0 to 4.0 weight percent. The baseline evaporation rate was determined to be 0.46 mg/min/sq. in. from a fairly large number of experimental tests (Table 11).

TABLE 11

METHYLENE CHLORIDE, WAX, GELLING AGENTS, METHANOL, ADDITIVES

| SOLN. NO. | COMPOSITION | WT % | EVAP. RATE MG/MIN/SQ. IN. | NO. OF TESTS |
|---|---|---|---|---|
| 1 | METHYLENE CHLORIDE | | | |
| | + WAX | 0.4–1.0 | | |
| | + GELLING AGENT (S23) | 1.0 | | |
| | + METHANOL | 2.0–4.0 | 0.46 | 22 |
| | METHYLENE CHLORIDE | | | |
| | + WAX | 0.5–2.0 | | |
| | + GELLING AGENT (S23) | 1.0 | | |
| | + METHANOL | 2.0–4.0 | | |
| | + HETEROCYCLIC ADDITIVE | | | |
| 2A | N-METHYLPYRROLIDONE | 1.0 | 0.29 | 4 |
| 2B | BUTYROLACTONE | 1.0 | 0.25 | 4 |
| 2C | PROPYLENE CARBONATE | 1.0 | 0.24 | 4 |
| 2D | (gamma)-DECANOLACTONE | 1.0 | 0.35 | 2 |
| 2E | (delta)-DECANOLACTONE | 1.0 | 0.19 | 2 |
| | AVERAGE | | 0.30 | 16 |
| | METHYLENE CHLORIDE | | | |
| | + WAX | 0.5–2.0 | | |
| | + GELLING AGENT (S23) | 1.0 | | |
| | + METHANOL | 2.0–4.0 | | |
| | + POLYHYDROXY ADDITIVE | | | |
| 3A | GLYCERIN | 1.0–4.0 | 0.13 | 17 |
| 3B | ETHYLENE GLYCOL | 1.0–4.0 | 0.20 | 15 |
| | AVERAGE | | 0.16 | 32 |
| | METHYLENE CHLORIDE | | | |
| | + WAX | 0.5–2.0 | | |

TABLE 11-continued

METHYLENE CHLORIDE, WAX, GELLING AGENTS, METHANOL, ADDITIVES

| SOLN. NO. | COMPOSITION | WT % | EVAP. RATE MG/MIN/SQ. IN. | NO. OF TESTS |
|---|---|---|---|---|
| | + GELLING AGENT (S23) | 1.0 | | |
| | + METHANOL | 2.0–4.0 | | |
| | + POLYGLYCOL ADDITIVE | | | |
| 4A | BRIJ 30 | 1.0 | 0.16 | 4 |
| 4B | BRIJ 35 | 1.0 | 0.14 | 2 |
| 4C | PEG 140 | 1.0 | 0.15 | 2 |
| 4D | PEG 208 | 1.0 | 0.07 | 2 |
| 4E | PEGME | 1.0 | 0.12 | 2 |
| | AVERAGE | | 0.13 | 12 |

As a whole, the five 5-membered ring heterocyclic compounds still appeared to contribute to a reduction in the evaporation rate with the overall "average" observed for these tests being 0.30 mg/min/sq. in. In this series of tests (delta)-decanolactone appeared to be the best performer. For a fairly large number of tests, glycerin solutions showed an "average" evaporation rate of 0.13 mg/min/sq. in. while the corresponding number for ethylene glycol was 0.20 mg/min/sq. in. Some limited testing with poly glycol derivatives is also presented in Table 11.

It should be noted that for both the 5-membered ring heterocycles and the polyhydroxy-compounds of the "second generation" additives, the effect of the additives in reducing evaporation rate was less at this matrix level (Table 11, with methanol) as compared to the prior matrix level (Table 10, without methanol). This trend reflects the contribution that methanol makes to desolubilization of the wax without the presence of any additional additives. The observed differences between the first generation additives (five membered ring heterocyclic derivatives) and second generation additives (glycerin and ethylene glycol) may be due to the "liquid—solid film" concept discussed previously. These results suggest that additives such as the five membered ring heterocycles, which reduce the solubility of wax, will be only marginally effective in high "methanol" paint stripper formulations (i.e., formulations with greater than 10 percent methanol).

The next matrix level studied in this laboratory program involved the addition of toluene to the formulation. While both toluene and methanol content were varied within limits, these experiments did feature fixed concentrations of wax and gelling agent at 1.0 weight percent. Toluene was included in the matrix because it has been found in commercial formulations and toluene represents a wax "solubilizer" as compared to methanol which is believed to reduce the solubility of wax. The baseline evaporation rate developed for this five component matrix was 0.41 mg/min/sq. in. (Table 12) and differed only modestly from the baseline observed for solutions which did not contain toluene (0.46 mg/min/sq. in.) (Table 11).

TABLE 12

METHYLENE CHLORIDE, WAX, GELLING AGENTS, METHANOL, TOLUENE, ADDITIVES

| SOLN. NO. | COMPOSITION | WT % | EVAP. RATE MG/MIN/SQ. IN. | NO. OF TESTS |
|---|---|---|---|---|
| 1 | METHYLENE CHLORIDE | | | |
| | + WAX | 1.0 | | |
| | + GELLING AGENT (S23) | 1.0 | | |
| | + METHANOL | 2.0–4.0 | | |
| | + TOLUENE | 0.0–2.0 | 0.41 | 33 |
| | METHYLENE CHLORIDE | | | |
| | + WAX | 1.0 | | |
| | + GELLING AGENT (S23) | 1.0 | | |
| | + METHANOL | 2.0–4.0 | | |
| | + TOLUENE | 0.0–2.0 | | |
| | + HETEROCYCLIC ADDITIVE | | | |
| 2A | N-METHYLPYRROLIDONE | 1.0–4.0 | 0.36 | 12 |
| 2B | BUTYROLACTONE | 1.0–4.0 | 0.39 | 10 |
| 2C | PROPYLENE CARBONATE | 1.0–4.0 | 0.38 | 12 |
| | AVERAGE | | 0.38 | 16 |
| | METHYLENE CHLORIDE | | | |
| | + WAX | 1.0 | | |
| | + GELLING AGENT (S23) | 1.0 | | |
| | + METHANOL | 2.0–4.0 | | |
| | + TOLUENE | 0.0–2.0 | | |
| | + POLYHYDROXY ADDITIVE | | | |
| 3A | GLYCERIN | 1.0–4.0 | 0.22 | 14 |
| 3B | ETHYLENE GLYCOL | 1.0 | 3.83 | 2 |
| | AVERAGE | | 0.67 | 16 |

TABLE 12-continued

METHYLENE CHLORIDE, WAX, GELLING AGENTS, METHANOL, TOLUENE, ADDITIVES

| SOLN. NO. | COMPOSITION | WT % | EVAP. RATE MG/MIN/SQ. IN. | NO. OF TESTS |
|---|---|---|---|---|
| | METHYLENE CHLORIDE | | | |
| | + WAX | 1.0 | | |
| | + GELLING AGENT (S23) | 1.0 | | |
| | + METHANOL | 2.0–4.0 | | |
| | + TOLUENE | 0.0–2.0 | | |
| | + POLYAMINE ADDITIVE | | | |
| 4A | TRIETHANOL AMINE | 1.0–4.0 | 0.24 | 11 |
| 4B | TETRAETHYLENETETRAAMINE | 1.0–4.0 | 0.23 | 12 |
| | AVERAGE | | 0.23 | 23 |

While the 5-membered ring heterocyclic derivatives still showed some ability to reduce the evaporation rate, the gap with baseline results narrowed considerably (Table 12 versus Table 11). The effectiveness of glycerin was also less in solutions containing toluene; however, there was still a 50 percent reduction as compared to the baseline measurement (Table 12). Results for ethylene glycol solutions were unexpected as they exhibited highly elevated evaporation rates as compared to baseline solutions. The cause of these results is unclear although the trend agrees with the earlier slack-wax studies. It is theorized that in the presence of wax solubilizers, higher additive levels are needed to impact the evaporation rate. Yet, the baseline data does not suggest that toluene weakens the evaporation barrier.

Some additional experiments were conducted involving the use of polyfunctional amines as additives. While the data appear to be comparable to that recorded for glycerin solutions (Table 12), other observations bring into question the utility of these amines in this application. Specifically, the solutions appeared to "salt-out" on standing. It is theorized that the amines catalyzed the hydrolysis or reacted with methylene chloride with the resultant formation of amine hydrochlorides. Obviously commercial formulations must exhibit long term stability and no further studies with amine additives were performed.

Gelling Agent Comparison

The final set of studies within the matrix concept involved a comparison of gelling agents. As noted earlier the gelling agent (alternatively known as thixotropic agents) used in most of the laboratory studies was hydroxypropyl cellulose, S23. Comparative runs were made with another gelling agent, ethylcellulose, S105, both with and without glycerin. In these experiments comparisons were made both for methylene chloride/wax/gelling agent/methanol and methylene chloride/wax/gelling agent/methanol/toluene solutions. For the purposes of this segment of the study the data were combined without factoring in the presence or absence of toluene (Table 13).

TABLE 13

GELLING AGENT STUDIES

| SOLN. NO. | COMPOSITION | WT % | EVAP. RATE MG/MIN/SQ. IN. | NO. OF TESTS |
|---|---|---|---|---|
| 1A | METHYLENE CHLORIDE | | | |
| | + WAX | 1.0 | | |
| | + GELLING AGENT (S23) | 1.0 | | |
| | + METHANOL | 1.0–2.0 | | |
| | + TOLUENE | 0.0–2.9 | 0.46 | 8 |
| 1B | METHYLENE CHLORIDE | | | |
| | + WAX | 1.0 | | |
| | + GELLING AGENT (S23) | 1.0 | | |
| | + METHANOL | 1.0–2.0 | | |
| | + TOLUENE | 0.0–2.0 | | |
| | + GLYCERIN | 1.0–2.0 | 0.38 | 4 |
| | AVERAGE | | 0.42 | 12 |
| 2A | METHYLENE CHLORIDE | | | |
| | + WAX | 1.0 | | |
| | + GELLING AGENT (S23) | 1.0 | | |
| | + METHANOL | 1.0–2.0 | | |
| | + TOLUENE | 0.0–2.0 | 0.63 | 8 |
| 2B | METHYLENE CHLORIDE | | | |
| | + WAX | 1.0 | | |
| | + GELLING AGENT (S105) | 1.0 | | |
| | + METHANOL | 1.0–2.0 | | |
| | + TOLUENE | 0.0–2.0 | | |
| | + GLYCERIN | 1.0–2.0 | 0.56 | 4 |
| | AVERAGE | | 0.61 | 12 |

In both comparisons, solutions containing the hydroxypropylcellulose (S23) thickening agent exhibited lower evaporation rates than were seen for formulations containing ethylcellulose (S105). The effectiveness of glycerin as an additive was marginal in these experiments. A substantially better reduction was noted earlier with similar solutions (Table 12).

Stripping Effectiveness

Some variation of cure conditions for tests panels used in this study was noted previously. There was some concern whether differing conditioning protocols would significantly impact the outcome of the stripping tests. A series of test panels which included: a 1-year old panel in which each layer was oven baked for 24 hours before a subsequent layer was applied; an air-dried, 10-week old test panel; and an oven baked, 10 week old panel in which each coating layer was air-dried 24 hours before a subsequent layer was applied, were tested for strippability with a commercial stripper.

Stripping rates were determined for alkyd and urethane coatings. Two ratings are presented for each test (Table 14).

TABLE 14
TEST PANEL CONDITIONING - STRIPPING TESTS

| TEST PANEL CONDITIONING | ALKYD COATING (PERCENT PRIMER VISIBLE) (a) | URETHANE COATING (PERCENT PRIMER VISIBLE) (a) |
|---|---|---|
| OVEN BAKED 1 YR OLD | 100 (96) | 90 (90) |
| AIR-DRIED, OVEN BAKED 10 WEEK OLD | 100 (98) | 70 (65) |
| AIR-DRIED, 10 WEEK OLD | 100 (95) | 90 (88) |

(a) The first number of each pair is a visual estimate while the second number is a calculated ratio form reading a grid.

The first number represents a visual estimate of the percentage of white primer visible after the stripping solution was scraped from the surface. The second number represents an attempt at a more quantifiable estimate in which a wire grid (81 units per square inch) was placed over the test area and the ratio of grid units showing white to the total number of grid units in the stripped surface area was calculated.

While the two results are comparable, the grid unit seems to result in a lower estimate of effectiveness. The mode of preparation for alkyd test panels seems to have minimal effect. The urethane panels prepared by air drying between the application of each coating layer with subsequent oven drying of the panel was the most difficult to strip.

Stripper tests were also run for experimental formulations containing methanol and glycerin (Table 15).

TABLE 15
STRIPPING TESTS - METHANOL, GLYCERIN FORMULATIONS

| METHANOL (PERCENT) | GLYCERIN | ALKYD COATING (PERCENT PRIMER VISIBLE) | URETHANE COATING (PERCENT PRIMER VISIBLE) |
|---|---|---|---|
| 4.0 | 0.0 | 50 | 80 |
| 4.0 | 1.0 | 99 | [a] |
| 4.0 | 2.0 | 90 | 40 |
| 4.0 | 4.0 | 95 | 50 |
| 2.0 | 2.0 | 100 | 100 |
| 2.0 | 4.0 | 85 | 20 |

[a] wood grain visible

The formulations tested consisted of methylene chloride, wax (1%) and thickening agent (1% S23) along with the specified levels of methanol and glycerin. These results suggest that glycerin can contribute to the effectiveness of the stripper. The ratio of glycerin relative to methanol is important and a 1 percent glycerin/4 percent methanol formulation may be optimum. As expected, alkyd test panels stripped easier than urethane coatings.

A more extensive series of formulations containing 5-membered ring heterocyclic compounds and glycerin were tested next for their strippability. The formulations that were chosen exhibited an evaporation rate below 0.20 mg/min/sq. in. These test formulations (Table 16) included wax (1 percent), thickening agent (1 percent, S23) and specified levels of methanol and toluene. Unlike the prior study, results were not as good as the baseline results. Again, these formulations included toluene which was shown to negatively impact the effectiveness of additives in reducing the evaporation rate.

TABLE 16
STRIPPING TESTS - METHANOL, TOLUENE FORMULATIONS

| TOLUENE (PERCENT) | ADDITIVE | ALKYD COATING (PERCENT PRIMER VISIBLE) | URETHANE COATING (PERCENT PRIMER VISIBLE) |
|---|---|---|---|
| METHANOL | | | |
| 4.0 | 1.0 | 0.0 | 70 | 60 |
| 4.0 | 2.0 | 0.0 | 80 | 90 |
| 2.0 | 1.0 | 0.0 | 80 | 80 |
| 2.0 | 2.0 | 0.0 | 30 | 50 |
| GLYCERIN | | | |
| 4.0 | 1.0 | 1.0 | 75 | 60 |
| 4.0 | 2.0 | 1.0 | 80 | 70 |
| 2.0 | 1.0 | 1.0 | 70 | 50 |
| 2.0 | 2.0 | 1.0 | 20 | 30 |
| N-METHYLPYRROLIDONE | | | |
| 4.0 | 1.0 | 1.0 | 70 | 50 |
| 4.0 | 2.0 | 1.0 | 70 | 80 |
| 2.0 | 2.0 | 1.0 | 30 | 20 |
| BUTYROLACTONE | | | |
| 4.0 | 1.0 | 1.0 | 50 | 10 |
| 4.0 | 2.0 | 1.0 | 70 | 60 |
| 2.0 | 1.0 | 1.0 | 80 | 50 |
| 2.0 | 2.0 | 1.0 | 0 | 60 |
| PROPYLENE CARBONATE | | | |
| 4.0 | 1.0 | 1.0 | 80 | 60 |
| 4.0 | 2.0 | 1.0 | 70 | 70 |
| 2.0 | 1.0 | 1.0 | 60 | 80 |
| 2.0 | 2.0 | 1.0 | 5 | 40 |

In summary, five membered-ring heterocyclic compounds of the present invention and in particular decanolactone, N-methylpyrrolidone and butyrolactone reduce the evaporation of methylene chloride in paint stripper formulations. Such compounds contain carbonyl functionalities capable of intermolecular interactions with methylene chloride (or other chlorinated solvents) and are effective in reducing the evaporation rate of methylene chloride from paint stripper.

It is noted that the theories presented herein are for the purpose of attempting to understand the present invention and are not intended to be limiting upon the scope of the invention or the claims.

It is to be understood that while certain forms of the present invention have been illustrated and described herein, it is not to be limited to the specific forms or arrangement of parts described and shown.

What is claimed and desired to be secured by Letters Patent is as follows:

1. An improved composition useful for stripping cured coatings of paint, varnish and other like coatings with a formulation comprising:
   (a) methylene chloride;
   (b) a wax; and (c) decanolactone for reducing the evaporation rate of said methylene chloride.

2. The composition of claim 1 further including a gelling agent.

3. The composition of claim 2 wherein said gelling agent is hydroxpropyl cellulose.

4. A composition useful for stripping cured coatings of paint, varnish and other like coatings comprising:
   (a) a major portion of methylene chloride;
   (b) about 0.5-1.5% by weight of a wax;
   (c) about 1.0% by weight of a gelling agent;
   (d) about 2.0 to 4.0% by weight methanol; and
   (e) about 1.0% by weight of an additive for reducing the evaporation rate of methylene chloride; said additive selected from a group consisting of decanolactone, N-methylpyrrolidone and butyrolactone.

5. An improved composition useful for stripping cured coatings of paint, varnish and other like coatings comprising:
   (a) a major portion of methylene chloride;
   (b) about 0.5-1.5% by weight wax;
   (c) about 1.0% by weight of a gelling agent;
   (d) about 1.0% by weight of an additive for reducing the evaporation rate of methylene chloride; said additive selected from a group consisting of decanolactone, N-methylpyrrolidone and butyrolactone.

6. A method of stripping cured coatings of paint, varnish, and other like coatings from a surface, comprising the step of applying a paint stripper to the surface, said stripper formulation comprising:
   (1) a major portion of methylene chloride;
   (2) about 0.5-1.5% by weight of wax;
   (3) about 1.0% by weight of a gelling agent;
   (4) 2.0-4.0% by weight of methanol; and
   (5) about 1.0-4.0% by weight of an additive for reducing the evaporation rate of methylene chloride; said additive selected from a group consisting of decanolactone, N-methylpyrrolidone and butyrolactone.

* * * * *